US009828882B2

(12) United States Patent
Numata et al.

(10) Patent No.: US 9,828,882 B2
(45) Date of Patent: Nov. 28, 2017

(54) THERMAL POWER GENERATION SYSTEM AND METHOD USING SUPERCRITICAL CARBON DIOXIDE AS WORKING FLUID

(71) Applicant: Mitsubishi Hitachi Power Systems, Ltd., Yokohama (JP)

(72) Inventors: Shohei Numata, Tokyo (JP); Susumu Nakano, Tokyo (JP); Takanori Shibata, Tokyo (JP); Hidefumi Araki, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 536 days.

(21) Appl. No.: 14/081,500

(22) Filed: Nov. 15, 2013

(65) Prior Publication Data

US 2014/0216034 A1    Aug. 7, 2014

(30) Foreign Application Priority Data

Feb. 1, 2013    (JP) .................................. 2013-018018

(51) Int. Cl.
*F01K 25/10* (2006.01)
*F02C 3/34* (2006.01)
(Continued)

(52) U.S. Cl.
CPC ............ *F01K 13/00* (2013.01); *F01K 25/103* (2013.01); *F02C 3/30* (2013.01); *F02C 3/34* (2013.01);
(Continued)

(58) Field of Classification Search
CPC . Y02E 60/15; F01K 7/32; F01K 13/02; F01K 19/02; F01K 19/10; F01K 23/02;
(Continued)

(56) References Cited

U.S. PATENT DOCUMENTS 4,079,591 A * 3/1978 Derby ..................... F03G 6/065
126/573
4,147,204 A    4/1979 Pfenninger
(Continued)

FOREIGN PATENT DOCUMENTS

CN    1804502 A    7/2006
CN    101668928 A    3/2010
(Continued)

OTHER PUBLICATIONS

Chinese Office Action issued in counterpart Chinese Application No. 201310525283.7 dated Jun. 24, 2015 (Ten (10) pages).

*Primary Examiner* — Laert Dounis
(74) *Attorney, Agent, or Firm* — Crowell & Moring LLP (57) ABSTRACT

A thermal power generation system includes a combustor burning oxygen and fuel with supercritical $CO_2$, a turbine driven by the supercritical $CO_2$ and water vapor fed from the combustor, a low-pressure supercritical $CO_2$ storage storing low-pressure supercritical $CO_2$ from the turbine, a compressor compressing the low-pressure supercritical $CO_2$, a high-pressure supercritical $CO_2$ storage storing high-pressure supercritical $CO_2$ from the compressor, and a high-pressure supercritical $CO_2$ feeder supplying between the high-pressure supercritical $CO_2$ storage and the combustor, in which the high-pressure supercritical $CO_2$ feeder supplies the high-pressure supercritical $CO_2$ to the combustor at a constant pressure. Thus, the thermal power generation system can perform adjustment of an electric power supply required to use unstable renewable energy sources such as solar and wind power, can achieve high efficiency power generation with high temperature working fluid, and can reduce emissions of environmental load substances such as $NO_x$ and $CO_2$.

7 Claims, 10 Drawing Sheets

(51) Int. Cl.
*F01K 13/00* (2006.01)
*F02C 3/30* (2006.01)
*F02C 6/18* (2006.01)

(52) U.S. Cl.
CPC ............ *F02C 6/18* (2013.01); *F05D 2210/12* (2013.01); *F05D 2210/14* (2013.01); *Y02E 20/16* (2013.01); *Y02E 20/344* (2013.01); *Y02E 50/11* (2013.01); *Y02E 60/15* (2013.01)

(58) Field of Classification Search
CPC .......... F01K 23/06; F01K 23/08; F01K 23/10; F01K 23/12; F01K 23/14; F01K 25/04; F01K 25/103; F02C 3/30; F02C 6/18; F02C 1/10
USPC ......... 60/650, 651, 652, 655, 659, 670, 671, 60/685, 689, 690
See application file for complete search history.

(56) References Cited

U.S. PATENT DOCUMENTS

| | | | |
|---|---|---|---|
| 4,189,925 A * | 2/1980 | Long | F01K 3/00 60/652 |
| 4,257,846 A * | 3/1981 | Pierce | G21D 5/06 376/243 |
| 4,353,214 A * | 10/1982 | Gardner | F01K 3/00 60/39.52 |
| 4,765,143 A | 8/1988 | Crawford et al. | |
| 6,279,312 B1 * | 8/2001 | Hennecke | F01D 15/10 60/39.3 |
| 6,345,517 B1 * | 2/2002 | Jahnke | F01K 23/068 62/643 |
| 2003/0111842 A1 * | 6/2003 | Gilbreth | F01D 15/10 290/52 |
| 2010/0024421 A1 | 2/2010 | Litwin et al. | |
| 2010/0101231 A1 | 4/2010 | Westmeier | |
| 2012/0186219 A1 * | 7/2012 | Gurin | C01B 3/22 60/39.19 |
| 2012/0216536 A1 | 8/2012 | Ma et al. | |
| 2013/0033044 A1 * | 2/2013 | Wright | F02C 9/00 290/1 R |
| 2013/0118145 A1 * | 5/2013 | Palmer | F02C 1/06 60/39.52 |
| 2013/0125525 A1 * | 5/2013 | Hein | F01K 23/10 60/39.182 |
| 2013/0270353 A1 * | 10/2013 | Long | F24H 4/00 237/8 A |
| 2013/0333385 A1 * | 12/2013 | Herbst | F01K 7/00 60/645 |
| 2014/0091574 A1 * | 4/2014 | Favy | F02C 6/16 290/52 |
| 2014/0210217 A1 * | 7/2014 | Scipio | F02C 9/26 290/40 B |

FOREIGN PATENT DOCUMENTS

| | | |
|---|---|---|
| CN | 102400867 A | 4/2012 |
| CN | 102834670 A | 12/2012 |
| JP | 63-239302 A | 10/1988 |
| JP | 3-215139 A | 9/1991 |
| JP | 2001-12213 A | 1/2001 |
| JP | 2001-159318 A | 6/2001 |
| WO | WO 2011/094294 A2 | 8/2011 |

* cited by examiner

THERMAL POWER GENERATION SYSTEM AND METHOD USING SUPERCRITICAL CARBON DIOXIDE AS WORKING FLUID

CLAIM OF PRIORITY

The present application claims priority from Japanese Patent application serial No. 2013-018018, filed on Feb. 1, 2013, the content of which is hereby incorporated by reference into this application.

BACKGROUND OF THE INVENTION

Field of the Invention

This invention relates to power generation systems, and more particularly to a thermal power generation system using a combustor and a gas turbine.

Description of Related Art

Technological development of thermal power generation systems equipped with a gas turbine which uses fossil fuel, such as natural gas, as a fuel has been encouraged in order to meet the demands to increase system efficiency and to cut $NO_x$ and $CO_2$ emissions from the viewpoints of effective use of fossil fuels and the reduction of environmental loads. High system efficiency is achieved by increasing the pressure ratio and combustion temperature. However, increasing the combustion temperature to a certain level or higher causes a reaction between nitrogen and oxygen in the air and thus produces nitride oxides ($NO_x$), which requires various measures to be taken. To cut carbon dioxide ($CO_2$) emission, a separation and capture technology including a chemical adsorption method or the like has gained attention.

One of the techniques of achieving both high efficiency and $NO_x/CO_2$ emission cuts is an oxy-fuel combustion technique in which oxygen and fuel undergo a reaction without using the air as a working fluid. In the case where water vapor and $CO_2$ are used as a working fluid, even if the combustion temperature is increased so as to achieve high efficiency, $NO_x$ is not emitted and $CO_2$ can be readily captured by condensing the water vapor because the exhaust gas contains only water vapor and $CO_2$. However, the use of water vapor as a main working fluid requires a condenser equivalent in size to a steam turbine used in general coal fired power plants and gas turbine combined cycle power plants, and therefore proposed systems mainly use $CO_2$ to aim at compactness and high-efficiency. Such systems are disclosed in Japanese Unexamined Patent Application Publication Nos. 2001-12213 (Patent Document 1) and 2001-159318 (Patent Document 2), for example.

On the other hand, power generation technologies not using fossil fuel at all such as photovoltaic power generation and wind power generation technologies have been developed and electric power derived from those technologies is recently forming an increasing proportion of electric power composition. However, since the sunlight and wind power are unstable power sources affected by the weather and other factors, power systems using those unstable power sources need to stabilize their electric power supply by flexibility resources such as pumped hydropower generation or thermal power generation. When the stabilization of the electric power supply is made by thermal power generation, the thermal power generation system has to start operation, stop operation, or operate partially in accordance with the increase and decrease in the electric power supply from the photovoltaic or wind power generation system. For excessive electric power supply, techniques to activate only a compressor to store compressed air have been developed, one of which is disclosed in U.S. Pat. No. 4,147,204 (Patent Document 3). In addition, as a technique to store energy more densely and efficiently, methods for generating high pressure carbon dioxide (triple-point $CO_2$) have been proposed instead of compressed air. For example, the methods are disclosed in Japanese Unexamined Patent Application Publication Nos. S63 (1988)-239302 (Patent Document 4) and H03 (1991)-215139 (Patent Document 5).

SUMMARY OF THE INVENTION

The thermal power generation system according to an embodiment of the present invention uses supercritical carbon dioxide as a working fluid. The thermal power generation system includes a combustor which burns oxygen and fuel with the supercritical carbon dioxide, a supercritical $CO_2$ turbine which is driven by the supercritical carbon dioxide and water vapor fed from the combustor, a supercritical $CO_2$ turbine generator which is driven by the supercritical $CO_2$ turbine, a low pressure $CO_2$ storage which stores low pressure carbon dioxide emitted from the supercritical $CO_2$ turbine, a supercritical $CO_2$ compressor which compresses the low pressure carbon dioxide, a high pressure supercritical $CO_2$ storage which stores high pressure supercritical carbon dioxide obtained by compressing the low pressure carbon dioxide by the supercritical $CO_2$ compressor, and a high pressure supercritical $CO_2$ feeder which supplies the high pressure supercritical carbon dioxide in the high pressure supercritical $CO_2$ storage to the combustor at a constant pressure.

According to the embodiment of the present invention, the thermal power generation system can adjust the electric power supply required in the use of an unstable renewable energy source, such as solar and windpower, can achieve high efficiency power generation with high temperature working fluid, and can reduce emissions of environmental load substances, such as $NO_x$ and $CO_2$.

DETAILED DESCRIPTION OF THE PREFERRED EMBODIMENTS

The thermal power generation technologies in the past were not developed in consideration of a supply adjustment for unstable renewable energy sources, such as solar and wind power. For example, the methods described in Patent Document 1 and Patent Document 2 can contribute to efficiency improvement accompanied with temperature rise, but are not suitable for storing energy to deal with supply variations along with the unstable power supply from the renewable energy sources since the oxy-fuel combustion turbine and $CO_2$ compressor are coupled to each other. The methods described in Patent Documents 3 to 5 include generating and storing compressed air and so on during night time and generating electricity during day time in which electric power demand grows. Therefore, the methods are not suitable to deal with the supply variations. Furthermore, the methods described in Patent Document 4 and Patent Document 5, for example, can store energy by using high pressure carbon dioxide, but cannot achieve highly-efficient power generation with high temperatures because the high pressure carbon dioxide is heated through a heat exchanger and goes through different channels from where a working fluid for a combustion turbine goes.

The present invention has been made in view of the above-described circumstances and provides a thermal power generation system which can perform the supply adjustment required in the use of the unstable renewable energy source, such as solar and wind power, can achieve high efficiency power generation with high temperature working fluid, and can reduce emissions of environmental load substances such as $NO_x$ and $CO_2$.

With reference to the figures, embodiments of the present invention will be described below.

First Embodiment

Figure 1:
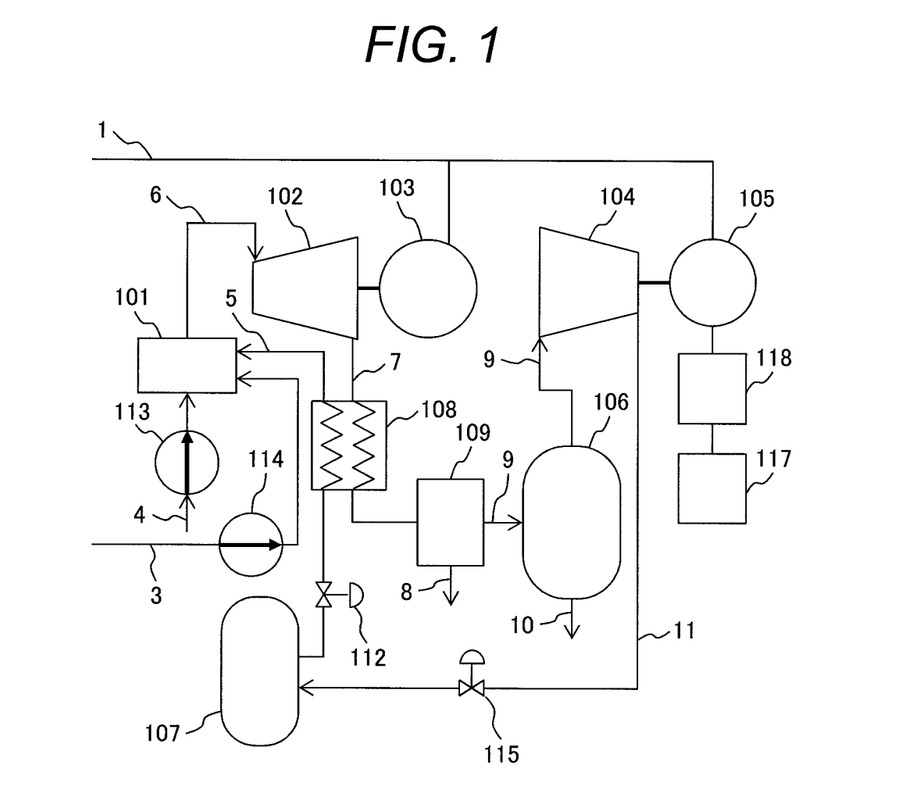
FIG. 1 is a system diagram of a thermal power generation system according to a first embodiment of the present invention.

FIG. 1 is a system diagram of a thermal power generation system according to a first embodiment of the present invention. In FIG. 1, the thermal power generation system according to the first embodiment uses supercritical carbon dioxide 5 as a working fluid. The thermal power generation system includes a combustor 101 which burns oxygen 3 and fuel 4 with the supercritical carbon dioxide 5, a pump 114 used to supply the oxygen 3 to the combustor 101, a pump 113 used to supply the fuel 4 to the combustor 101, a supercritical $CO_2$ turbine 102 which is driven by a mixed gas 6 of the supercritical carbon dioxide and water vapor supplied from the combustor 101, and a supercritical $CO_2$ turbine generator 103 which is driven by the supercritical $CO_2$ turbine 102.

In addition, the thermal power generation system of the first embodiment includes a regenerated heat exchanger 108 which heats the supercritical carbon dioxide 5 with turbine exhaust gas 7 emitted from the supercritical $CO_2$ turbine 102, a water removal unit 109 which cools the turbine exhaust gas 7 to remove water 8 therefrom, a low pressure $CO_2$ storage 106 which stores low pressure carbon dioxide 9 obtained by separating from the turbine exhaust gas 7 with water removed and includes a capturing unit for capturing surplus carbon dioxide 10, a supercritical $CO_2$ compressor 104 which produces supercritical carbon dioxide by compressing the low pressure carbon dioxide 9, and a motor 105 which drives the supercritical $CO_2$ compressor 104 with grid power 1. Herein, "storage" is also referred to as a storage unit.

Furthermore, the thermal power generation system of the first embodiment includes a power fluctuation sensor 117 which detects the supply variations in the grid power 1, a supercritical $CO_2$ compressor output controller 118 which controls output of the supercritical $CO_2$ compressor 104 based on the detection results of the power fluctuation sensor 117, a high pressure supercritical $CO_2$ storage 107 which stores high pressure supercritical carbon dioxide 11 obtained through compression by the supercritical $CO_2$ compressor 104, a valve 115 which closes when the supercritical $CO_2$ compressor 104 is not operating, and a high pressure supercritical $CO_2$ feeder 112 which supplies the high pressure supercritical carbon dioxide 5 in the high pressure supercritical $CO_2$ storage 107 to the combustor 101 at a constant pressure.

Figure 2:
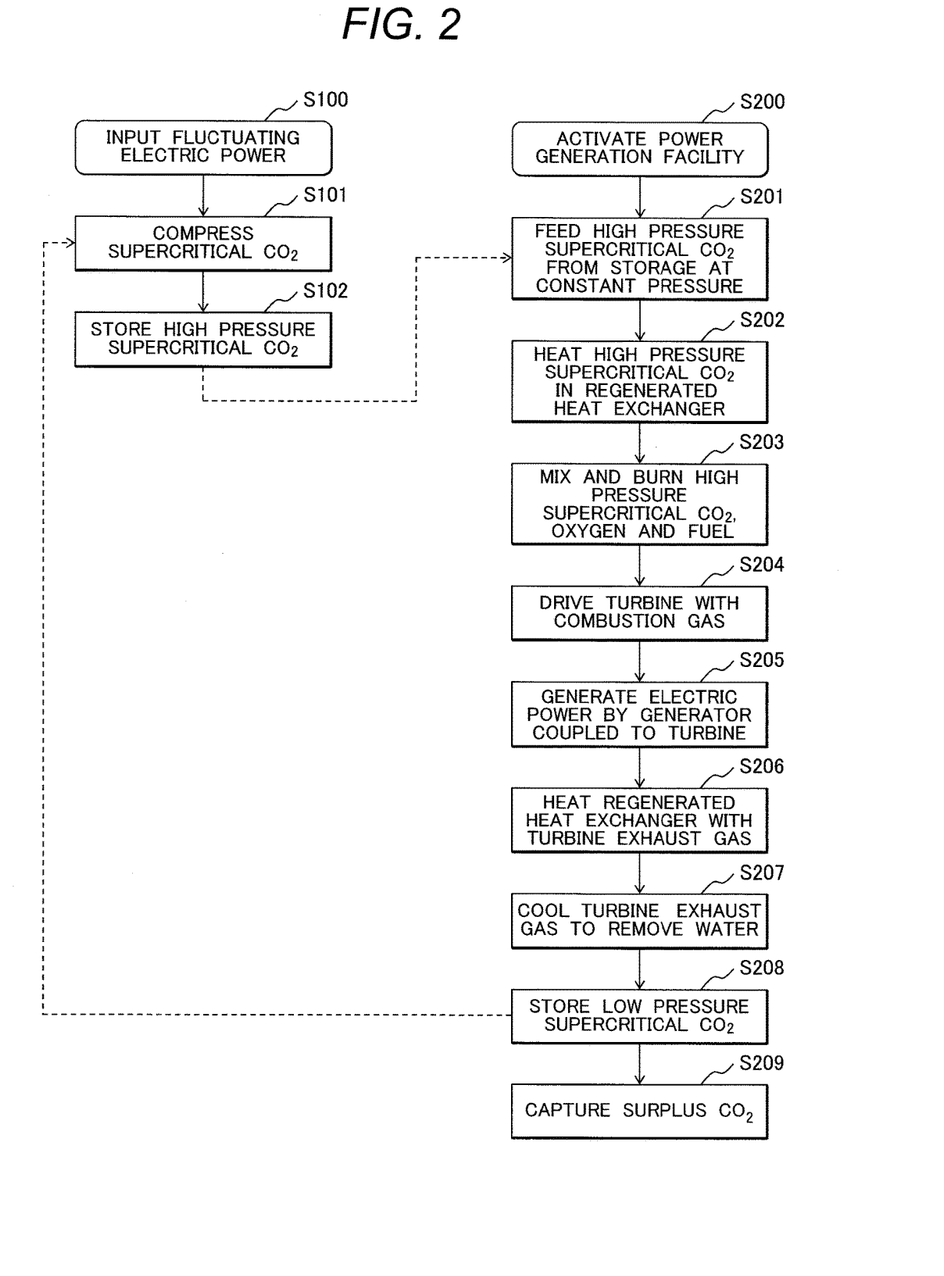
FIG. 2 is a flowchart showing a power generation method of the thermal power generation system according to the first embodiment of the present invention.

FIG. 2 is a flowchart describing a power generation method of the thermal power generation system according to the first embodiment of the present invention. Along the steps in FIG. 2, the method of operating the thermal power generation system of the first embodiment will be described. In FIG. 2, steps S100 to S102 belong to the method of operating the supercritical $CO_2$ compressor 104, while steps S200 to S209 belong to the method of operating the supercritical $CO_2$ turbine 102, and they operate individually.

In the method of operating the supercritical $CO_2$ compressor 104, firstly grid power 1 is input in step S100. The grid power 1 is fluctuating electric power derived from variable renewable generation sources, such as solar and wind power. In step S101, the supercritical $CO_2$ compressor 104 is driven with the fluctuating electric power and then compresses low pressure carbon dioxide 9 in the low pressure $CO_2$ storage 106 to produce high pressure supercritical carbon dioxide. The low pressure carbon dioxide 9 herein may be supercritical carbon dioxide near the critical point. Then, the high pressure supercritical carbon dioxide produced in step S101 is stored in the high pressure supercritical $CO_2$ storage 107 in step S102.

In this embodiment, the supercritical $CO_2$ compressor output controller 118 is designed to control the output of the supercritical $CO_2$ compressor 104 so which the supercritical $CO_2$ compressor 104 operates in accordance with the fluctuating grid power 1 detected by the power fluctuation sensor 117.

In the method of operating the supercritical $CO_2$ turbine 102, it is determined to activate the power generation facility in step S200, thereafter the high pressure supercritical carbon dioxide 5 stored in the high pressure supercritical $CO_2$ storage 107 is fed by the high pressure supercritical $CO_2$ feeder 112 at a constant pressure in step S201. In step S202, the high pressure supercritical carbon dioxide 5 maintained at a constant pressure is heated by the regenerated heat exchanger 108. In step S203, the constant high pressure supercritical carbon dioxide 5 is mixed with fuel 4 and oxygen 3 which are supplied at a constant pressure from the pumps 113 and 114, respectively, and burned together in the combustor 101. In step S204, the supercritical $CO_2$ turbine 102 is driven by mixed gas 6 produced from the supercritical carbon dioxide and water vapor in step S203. In step S205, the generator 103 coupled to the supercritical $CO_2$ turbine 102 is driven to generate electric power.

Then, turbine exhaust gas 7 emitted from the supercritical $CO_2$ turbine 102 is introduced into the regenerated heat exchanger 108 in step S206 to be used to heat up the high pressure supercritical carbon dioxide 5 in step S202. Accordingly, the regenerated heat exchanger 108 applies the heat of the turbine exhaust gas 7 to the high pressure supercritical carbon dioxide 5 before being introduced into the combustor 101, thereby improving system efficiency.

Subsequently, the water removal unit 109 cools the turbine exhaust gas 7 to remove water 8 in step S207. In step S208, low pressure carbon dioxide 9 obtained by separating it from the turbine exhaust gas 7 after the water 8 has been removed is stored in the low pressure $CO_2$ storage 106. The low pressure carbon dioxide 9 may be supercritical carbon dioxide near a critical point, and the low pressure $CO_2$ storage 106 may be a storage storing supercritical $CO_2$ near the critical point.

In the last step S209, surplus carbon dioxide 10 is captured from the low pressure $CO_2$ storage 106 equipped with a $CO_2$ capturing unit. Accordingly, the emission of $CO_2$ into the air can be reduced.

Further, in the above operating methods, the low pressure carbon dioxide stored in step S208 is compressed in step S101 and the high pressure supercritical carbon dioxide stored in step S102 is used in step S201. But the operation of the supercritical $CO_2$ compressor 104 from steps S100 to S102, and the operation of the supercritical $CO_2$ turbine 102 from steps S200 to S209 are separately performed because the low pressure $CO_2$ storage 106 and high pressure supercritical $CO_2$ storage 107 play a role of a buffer in the respective operations.

Figure 3:
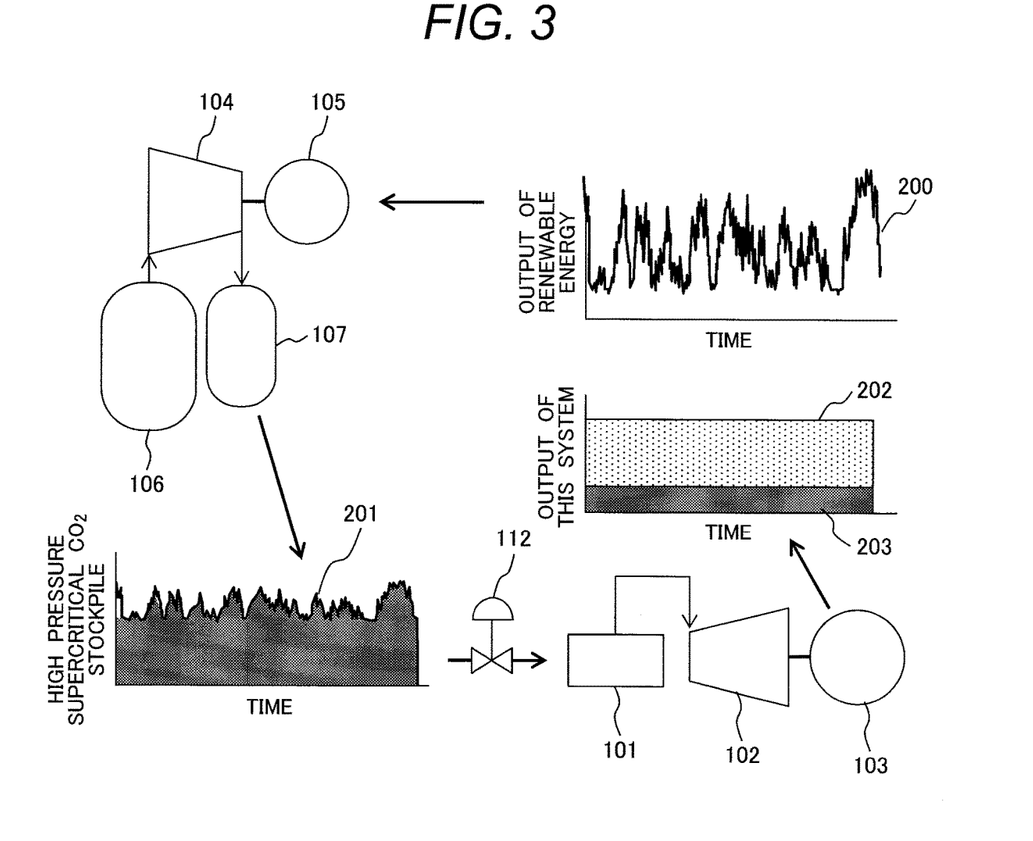
FIG. 3 is a schematic diagram showing a principle of adjustment of an electric power supply with the thermal power generation system according to the first embodiment of the present invention.

FIG. 3 is a schematic diagram showing a principle of adjustment of the electric power supply with the thermal power generation system according to the first embodiment of the present invention. With reference to FIG. 3, a method for adjusting the electric power supply with the thermal power generation system according to the first embodiment will be described. Graph 200 has a horizontal axis of time and a vertical axis of output to present an example of fluctuating electric power generated from renewable energy, such as solar and wind power. As appreciated from graph 200, the power generation facility using sun light, wind power or other renewable power sources cannot stably generate the rated output power and the outputs per hour vary from 0% to 100% within the rated output. In this embodiment, the average output is about 25% of the rated output.

The thermal power generation system according to the first embodiment of the present invention uses fluctuating electric power 200 derived from renewable energy to drive the motor 105. The supercritical $CO_2$ compressor 104 coupled to the motor 105 compresses low pressure carbon dioxide from the low pressure $CO_2$ storage 106 to produce high pressure supercritical carbon dioxide and stores it in the high pressure supercritical $CO_2$ storage 107. In short, the supercritical $CO_2$ compressor 104 and the supercritical $CO_2$ turbine 102, each having an independent rotary shaft, and the supercritical $CO_2$ compressor drive motor for driving the supercritical $CO_2$ compressor provided in the thermal power generation system can absorb and store the fluctuating grid power 1 to level out the supply.

Graph 201 has a horizontal axis of time and a vertical axis of mass or pressure to present the amount of high pressure supercritical carbon dioxide stored in the high pressure supercritical $CO_2$ storage 107. As appreciated from graph 201, the high pressure supercritical $CO_2$ storage 107 stores a certain amount of high pressure supercritical carbon dioxide or more than that, thereby mitigating the effect of the fluctuation in the renewable energy power 200.

In addition, the high pressure supercritical carbon dioxide stored in the high pressure supercritical $CO_2$ storage 107 is fed by the high pressure supercritical $CO_2$ feeder 112 to the combustor 101 at a constant pressure and is used to highly efficiently drive the supercritical $CO_2$ turbine 102 at a rated output all the time, thereby allowing the generator 103 to stably generate electric power. Graph 202 has a horizontal axis of time and a vertical axis of output to present electric power generated by the generator 103. Of the electric power 202 generated by the generator 103, the electric power 203 of the shaded area is derived from renewable energy, which indicates that the fluctuating electric power 200 of the renewable energy is smoothed out to achieve stable supply of averaged output power.

Thus, the thermal power generation system of the first embodiment can absorb the supply fluctuation of the unstable grid power 1 derived from renewable energy and stores the energy to level out the supply and can drive the supercritical $CO_2$ turbine 102 at a rated power, thereby achieving highly-efficient power generation. Even if the grid power 1 is not supplied, the thermal power generation system can autonomously generate power by supplying part of the electric power output by the generator 103 to the motor 105.

In summary, the thermal power generation system of the first embodiment enables storage of the high pressure supercritical carbon dioxide by having the supercritical $CO_2$ compressor perform the supply follow-up operation with the use of electric power from unstable renewable energy sources, such as solar and wind power, and enables constant driving of the oxy-fuel combustion turbine with a rated output by constantly feeding the stored high pressure supercritical carbon dioxide to the turbine at a constant pressure, thereby reducing the emission of environmental load substances, such as $NO_x$ and $CO_2$, and achieving high efficient power generation.

Second Embodiment

Figure 4:
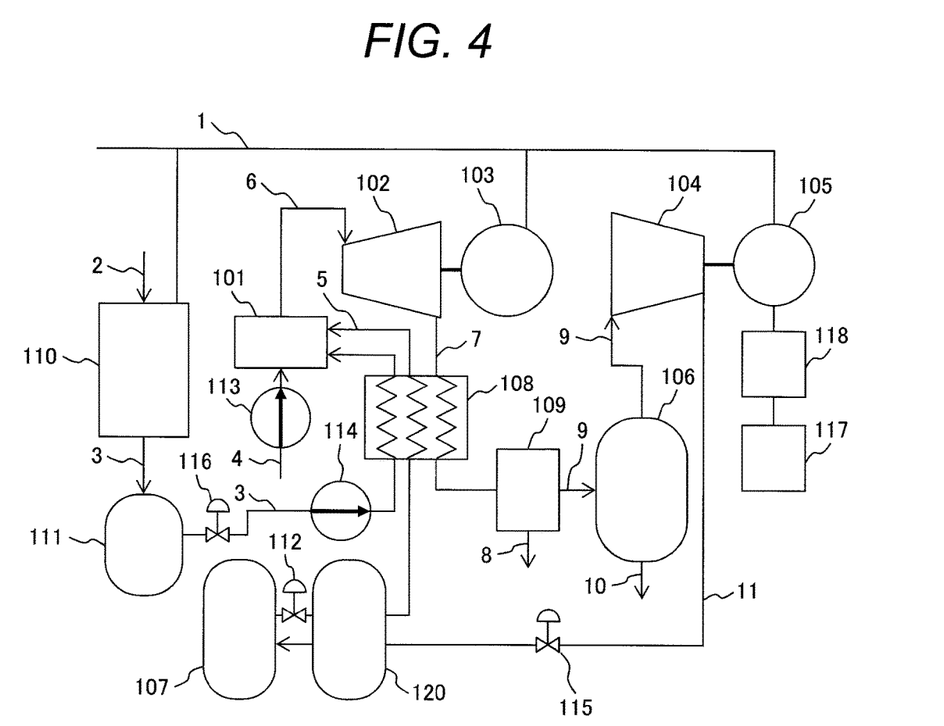
FIG. 4 is a system diagram of a thermal power generation system according to a second embodiment of the present invention.

With reference to FIG. 4, the features of the second embodiment will be described. FIG. 4 is a system diagram of a thermal power generation system according to the second embodiment of the present invention. The description below does not provide explanations about the same components and configurations as those in the first embodiment, but focuses on different components and configurations.

In FIG. 4, the thermal power generation system according to the second embodiment includes a heat storage 120 which recovers and stores heat of high pressure supercritical carbon dioxide 11 obtained through compression by the supercritical $CO_2$ compressor 104. With the heat storage 120, the heat generated during compression can be accumulated without going to waste and can be reused to heat the high pressure supercritical carbon dioxide 5 stored in the high pressure supercritical $CO_2$ storage 107. Thus, the heat loss which occurs while the high pressure supercritical carbon dioxide is stored can be reduced, thereby improving power generation efficiency.

In addition, the thermal power generation system according to the second embodiment includes an oxygen separation unit 110 which separates oxygen 3 from the air 2 by using the grid power 1 and an oxygen storage 111 which stores the separated oxygen 3. With the oxygen separation unit 110 and oxygen storage 111, oxygen required for oxy-fuel combustion in the combustor 101 can be prepared within the thermal power generation system. Since the oxygen separation unit 110 operates with the fluctuating grid power 1 derived from renewable energy as does the supercritical $CO_2$ compressor 104, the thermal power generation system can produce the effect of absorbing power fluctuation and storing energy, thereby more flexibly adjusting the supply in the use of the renewable energy source.

Furthermore, the thermal power generation system configured so as to heat the oxygen 3 by the regenerated heat exchanger 108 before feeding the oxygen 3 to the combustor 101 can enhance the combustion stability even if the oxygen stored in the oxygen storage 111 is low in temperature, and therefore can improve the system efficiency.

Third Embodiment

Figure 5:
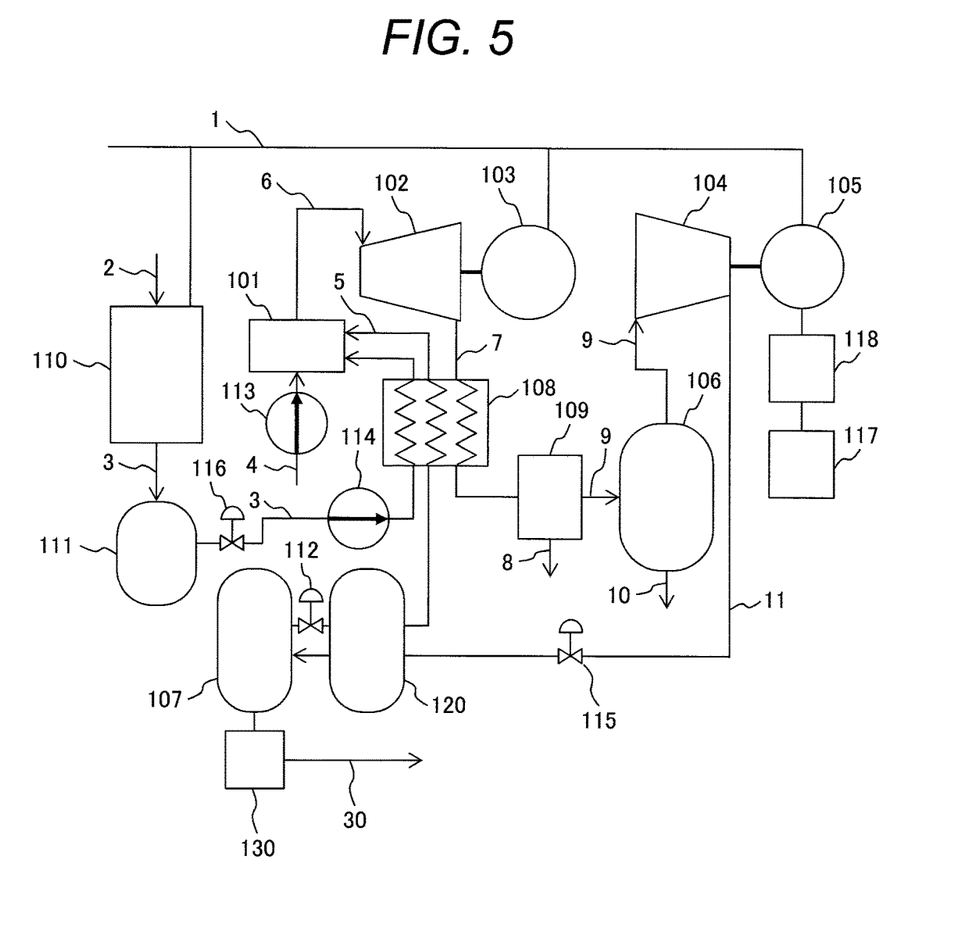
FIG. 5 is a system diagram of a thermal power generation system according to a third embodiment of the present invention.

FIG. 5 is a system diagram of a thermal power generation system according to the third embodiment of the present invention. The third embodiment possesses basic components common to the second embodiment. Therefore, descriptions of the common components to the second embodiment shown in FIG. 4 are omitted and the features of the third embodiment will be described by focusing on uncommon components with reference to FIG. 5.

In FIG. 5, the thermal power generation system according to the third embodiment includes a high pressure $CO_2$ capturing unit 130 which captures high pressure supercritical carbon dioxide 30 from the high pressure supercritical $CO_2$ storage 107 and sends it out, instead of capturing surplus carbon dioxide 10 from the low pressure $CO_2$ storage 106. With the high pressure $CO_2$ capturing unit 130, the $CO_2$ emission into the air can be reduced and the $CO_2$ captured is in a form available to EOR (Enhanced Oil Recovery) and other applications.

Fourth Embodiment

Figure 6:
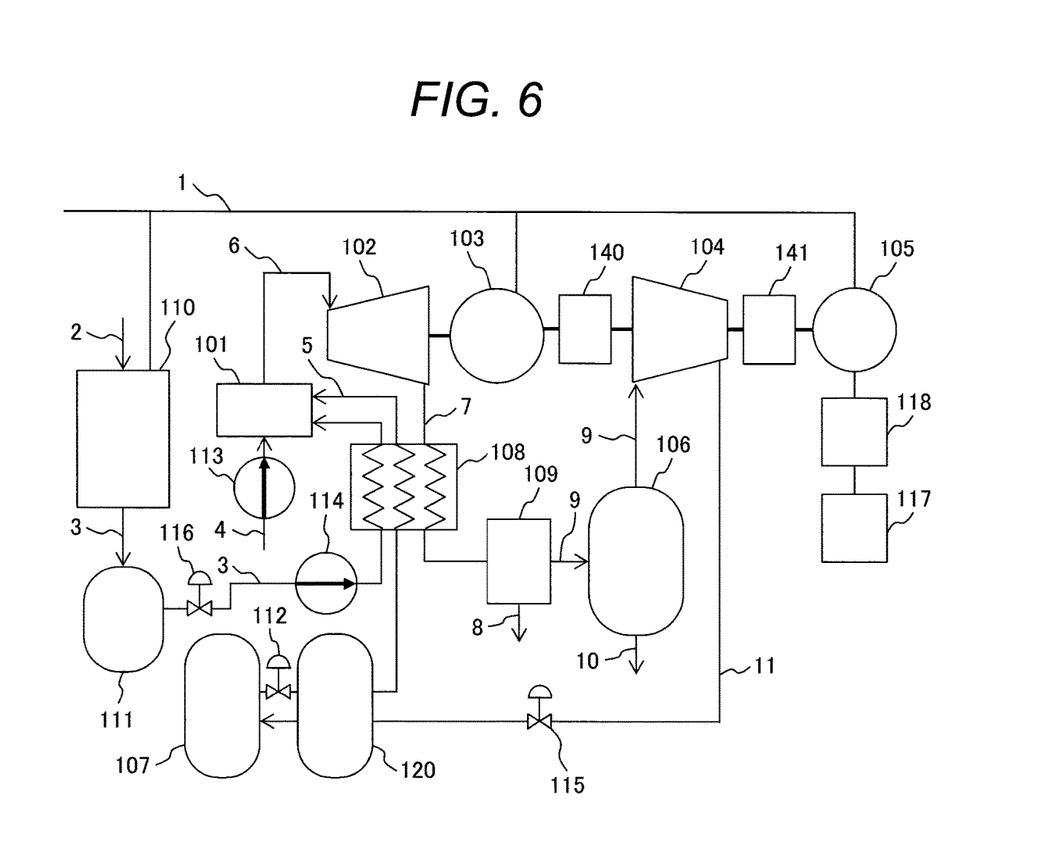
FIG. 6 is a system diagram of a thermal power generation system according to a fourth embodiment of the present invention.

FIG. 6 is a system diagram of a thermal power generation system according to the fourth embodiment of the present invention. The fourth embodiment possesses basic components common to the second embodiment. Therefore, descriptions of the common components to the second embodiment shown in FIG. 4 are omitted and the features of the fourth embodiment will be described by focusing on uncommon components with reference to FIG. 6.

In FIG. 6, the thermal power generation system according to the fourth embodiment includes a compressor-turbine coupling unit 140 which couples and separates the supercritical $CO_2$ compressor 104 to/from the supercritical $CO_2$ turbine 102 on an as needed basis and a compressor-motor coupling unit 141 which couples and separates the supercritical $CO_2$ compressor 104 to/from the motor 105 on an as needed basis.

According to the configuration, when the grid power 1 is not supplied, the compressor-motor coupling unit 141 can separate the supercritical $CO_2$ compressor 104 from the motor 105 and the compressor-turbine coupling unit 140 can couple the supercritical $CO_2$ compressor 104 to the supercritical $CO_2$ turbine 102, thereby enabling highly efficient autonomous power generation.

In addition, when the grid power 1 is supplied, the compressor-motor coupling unit 141 can couple the supercritical $CO_2$ compressor 104 to the motor 105 and the compressor-turbine coupling unit 140 can separate the supercritical $CO_2$ compressor 104 from the supercritical $CO_2$ turbine 102, thereby storing energy of the grid power 1 to level out the supply. Thus, the thermal power generation system can switch between the supply leveling operation and efficient power generating operation to achieve both.

Fifth Embodiment

Figure 7:
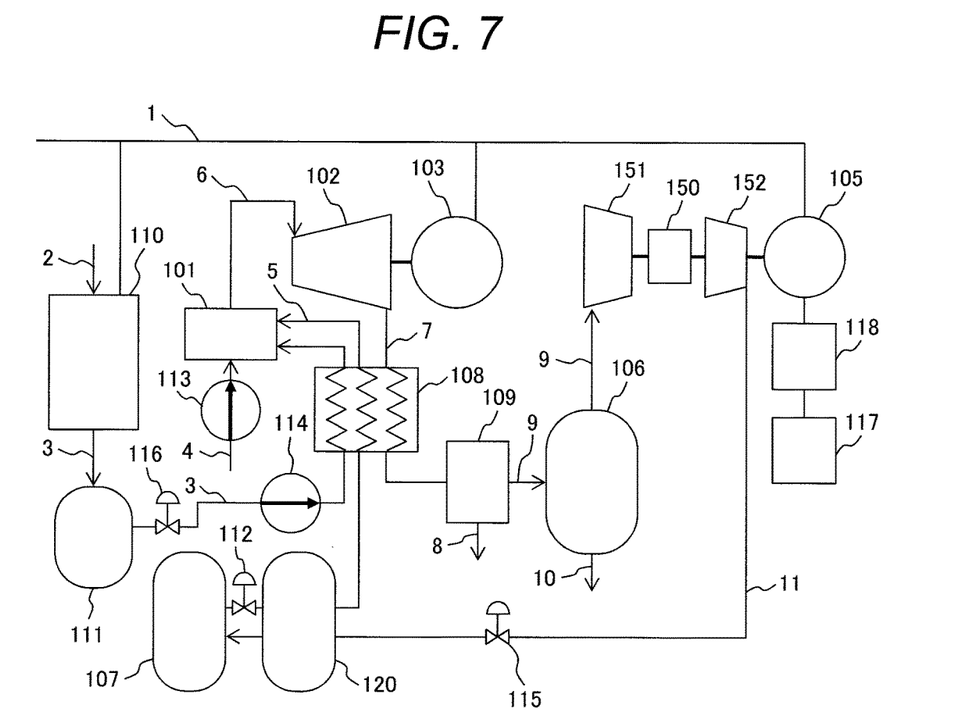
FIG. 7 is a system diagram of a thermal power generation system according to a fifth embodiment of the present invention.

FIG. 7 is a system diagram of a thermal power generation system according to the fifth embodiment of the present invention. The fifth embodiment possesses basic components common to the second embodiment. Therefore, descriptions of the common components to the second embodiment shown in FIG. 4 are omitted and the features of the fifth embodiment will be described by focusing on uncommon components with reference to FIG. 7.

In FIG. 7, the thermal power generation system according to the fifth embodiment includes a low pressure supercritical $CO_2$ compressor 151 instead of the supercritical $CO_2$ compressor 104, an intercooler 150, and a high pressure supercritical $CO_2$ compressor 152. The intercooler 150 can suppress the temperature rise during compression, thereby contributing to efficiency enhancement and reducing heat loss occurring when the high pressure supercritical carbon dioxide is stored in the high pressure supercritical $CO_2$ storage 107.

The thermal power generation system of the fifth embodiment is configured to capture the heat generated during compression by only the heat storage 120; however, the intercooler 150 can be combined with the heat storage 120. According to this configuration, the heat captured by the intercooler 150 can be reused to heat the high pressure supercritical carbon dioxide at the time of supply, thereby further enhancing the efficiency.

Sixth Embodiment

Figure 8:
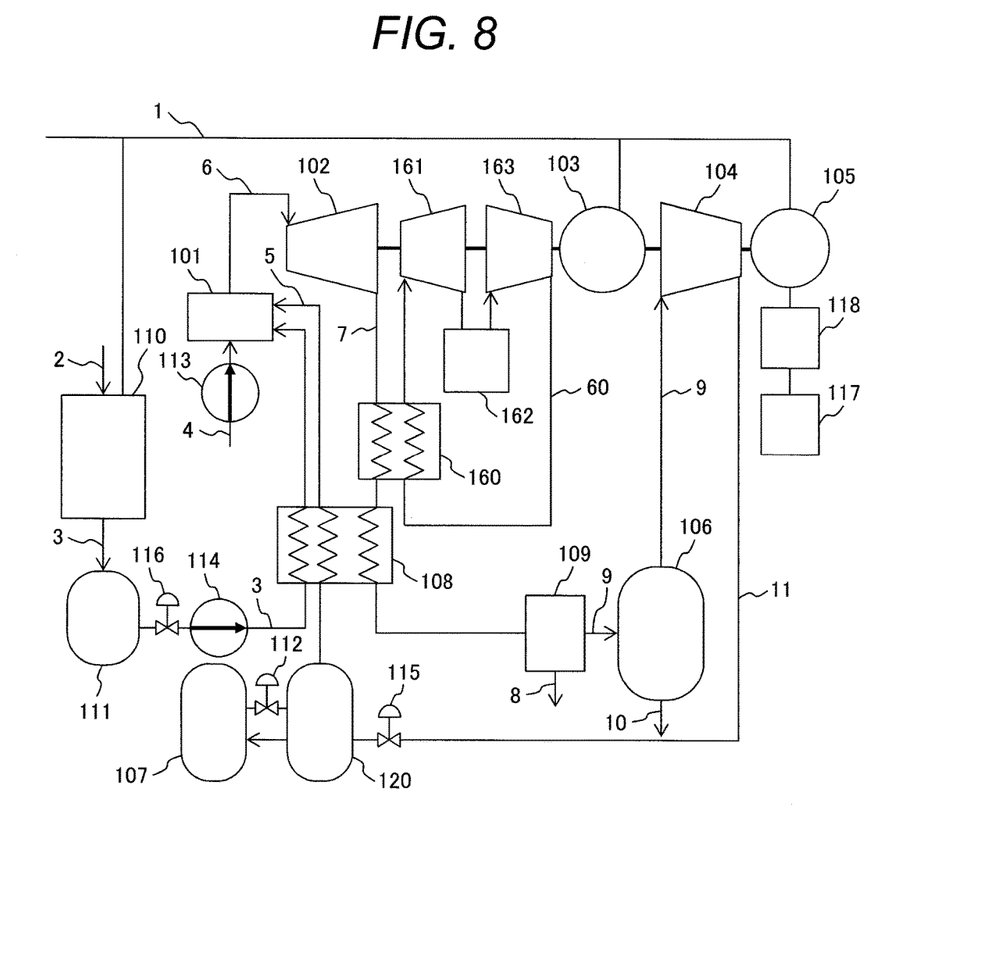
FIG. 8 is a system diagram of a thermal power generation system according to a sixth embodiment of the present invention.

FIG. 8 is a system diagram of a thermal power generation system according to the sixth embodiment of the present invention. The sixth embodiment possesses basic components common to the second embodiment. Therefore, descriptions of the common components to the second embodiment shown in FIG. 4 are omitted and the features of the sixth embodiment will be described by focusing on uncommon components with reference to FIG. 8.

In FIG. 8, the thermal power generation system according to the sixth embodiment includes an exhaust heat recovery unit 160 which heats supercritical carbon dioxide 60 in a secondary supercritical $CO_2$ closed cycle with the use of heat of exhaust gas from the supercritical $CO_2$ turbine, a secondary supercritical $CO_2$ compressor 163, a secondary supercritical $CO_2$ turbine 161, and a secondary cooler 162. These components can make up a supercritical $CO_2$ combined cycle to achieve further highly-efficient power generation.

The thermal power generation system according to the sixth embodiment has basic components common to the second embodiment; however, it can have a compressor coupled to a turbine as described in the fourth embodiment, or can use an intercooler as described in the fifth embodiment. The thermal power generation system configured as above can achieve higher efficiency than combined cycle power systems in the past even as an autonomous operation system.

Seventh Embodiment

Figure 9:
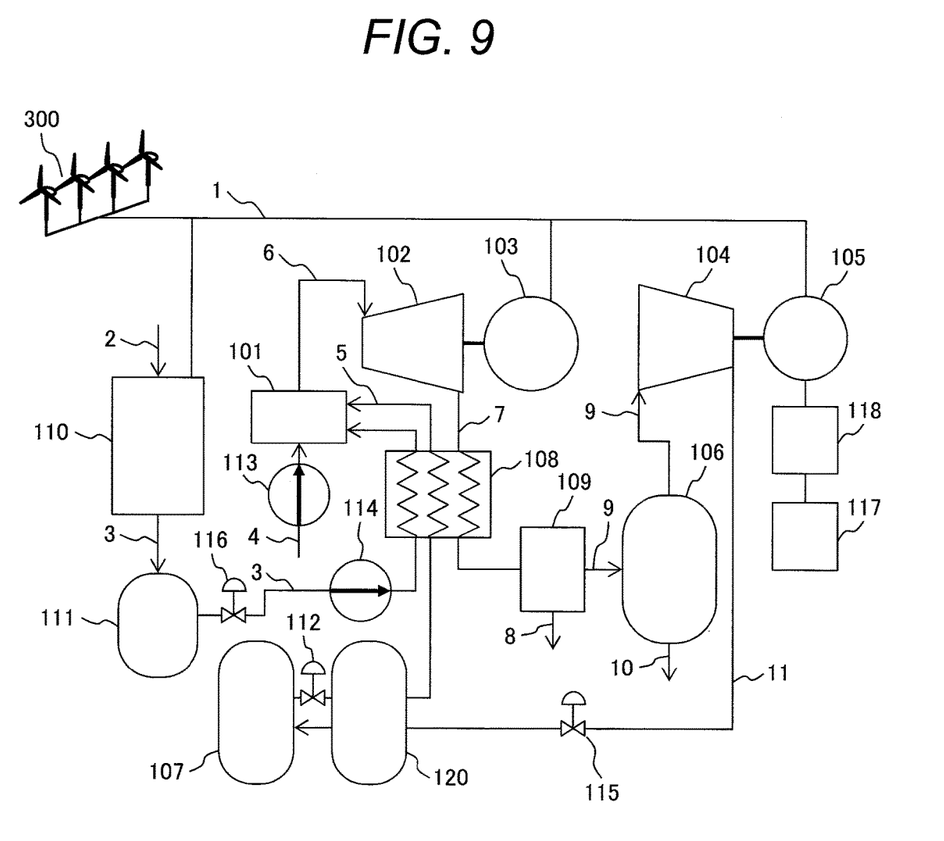
FIG. 9 is a system diagram of a thermal power generation system according to a seventh embodiment of the present invention.

FIG. 9 is a system diagram of a thermal power generation system according to the seventh embodiment of the present invention. The seventh embodiment possesses basic components common to the second embodiment. Therefore, descriptions of the common components to the second embodiment shown in FIG. 4 are omitted and the features of the seventh embodiment will be described by focusing on uncommon components with reference to FIG. 9.

In FIG. 9, the thermal power generation system according to the seventh embodiment includes a power generator 300 which uses renewable energy and has a rated output equivalent or less than the output of the supercritical $CO_2$ turbine. The power generator 300 can be a stable electric power source with the minimum fossil fuel for the power system without being affected by instability caused by the supply variations in the use of renewable energy. Also, for renewable energy like solar or wind power which cannot be supplied at controlled times, the addition of the energy storage system allows the energy to be stored when electrical power demand is low and allows electric power to be supplied during times when the demand and the unit price of the electric power is high.

Eighth Embodiment

Figure 10:
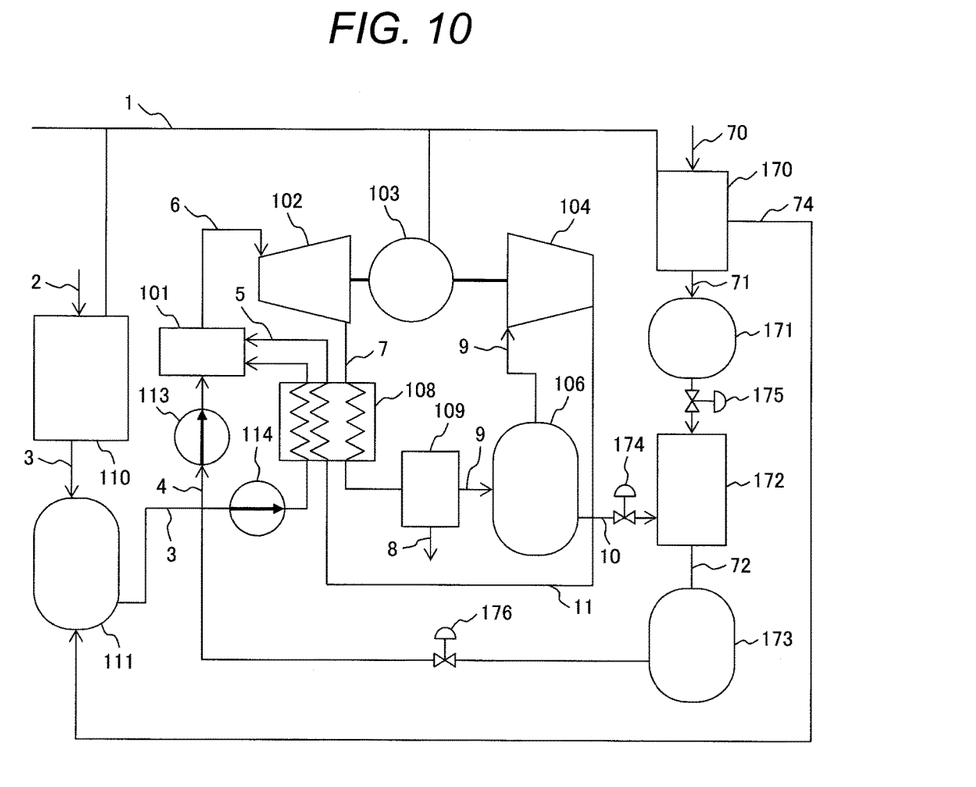
FIG. 10 is a system diagram of a thermal power generation system according to an eighth embodiment of the present invention.

FIG. 10 is a system diagram of a thermal power generation system according to the eighth embodiment of the present invention. In FIG. 10, the thermal power generation system according to the eighth embodiment includes an oxygen separation unit 110 which separates oxygen 3 from air 2 with the grid power 1, an oxygen storage 111 which stores the separated oxygen 3, a combustor 101 which burns oxygen 3 and methane 4 with the supercritical carbon dioxide 5, a pump 114 used to supply the oxygen 3 to the combustor 101, a supercritical $CO_2$ turbine 102 which is driven by a mixed gas 6 of the supercritical carbon dioxide and water vapor supplied from the combustor 101, a supercritical $CO_2$ turbine generator 103 which is driven by the supercritical $CO_2$ turbine 102, a regenerated heat exchanger 108 which heats the supercritical carbon dioxide 5 with turbine exhaust gas 7 emitted from the supercritical $CO_2$ turbine 102, a water removal unit 109 which cools the turbine exhaust gas 7 to remove water 8, a low pressure $CO_2$ storage 106 which stores low pressure carbon dioxide 9 obtained by separating from the turbine exhaust gas 7 with the water 8 removed, and a supercritical $CO_2$ compressor 104 which compresses the low pressure carbon dioxide 9 to produce supercritical carbon dioxide.

The thermal power generation system according to the eighth embodiment further includes a hydrogen separation unit 170 which separates oxygen 74 and hydrogen 71 from water 70 with the grid power 1, a hydrogen storage 171 which stores the hydrogen 71, a hydrogen storage valve 175, a methane generation unit 172 which extracts surplus carbon dioxide 10 from the low pressure $CO_2$ storage 106 and causes reaction between the carbon dioxide 10 and the hydrogen 71 to produce methane 72, a low pressure $CO_2$ valve 174, a methane storage 173 which stores the methane 72, a methane storage valve 176, and a pump 113 used to supply the methane 4 from the methane storage 173 to the combustor 101.

According to the eighth embodiment, the thermal power generation system can produce and store hydrogen, methane and oxygen with the unstable power 1 derived from renewable energy, can use the methane, which is produced with the renewable energy power 1, as a fuel to rotate the supercritical $CO_2$ turbine, and can reuse carbon dioxide exhaust to produce methane again, thereby achieving a completely-closed cycle power generation system without any $CO_2$ emission.

What is claimed is:

1. A thermal power generation system which uses supercritical carbon dioxide as a working fluid, the thermal power generation system comprising:
  a combustor which burns oxygen and fuel with the supercritical carbon dioxide;
  a supercritical $CO_2$ turbine which is driven by the supercritical carbon dioxide and water vapor supplied from the combustor;
  a supercritical $CO_2$ turbine generator which is driven by the supercritical $CO_2$ turbine;
  a low pressure $CO_2$ storage which stores low pressure carbon dioxide emitted from the supercritical $CO_2$ turbine;
  a supercritical $CO_2$ compressor which compresses the low pressure carbon dioxide;
  a high pressure supercritical $CO_2$ storage which stores high pressure supercritical carbon dioxide obtained by having the supercritical $CO_2$ compressor compress the low pressure carbon dioxide;
  a high pressure supercritical $CO_2$ feeder which supplies the high pressure supercritical carbon dioxide in the high pressure supercritical $CO_2$ storage to the combustor;
  a supercritical $CO_2$ compressor drive motor which drives the supercritical $CO_2$ compressor;
  a power fluctuation sensor which detects fluctuation of electric power with varying electric power supply; and
  a supercritical $CO_2$ compressor control unit configured to drive the supercritical $CO_2$ compressor drive motor and configured to: (i) increase an output of the supercritical $CO_2$ compressor to the high pressure supercritical $CO_2$ storage when the detected fluctuation of the electric power is an increase in the varying electric power supply or (ii) decrease the output of the supercritical $CO_2$ compressor to the high pressure supercritical $CO_2$ storage when the detected fluctuation of the electric power is a decrease in the varying electric power supply,
  wherein the high pressure supercritical $CO_2$ feeder supplies the high pressure supercritical carbon dioxide to the combustor at a constant pressure,
  wherein the supercritical $CO_2$ compressor has a rotary shaft independent from the supercritical $CO_2$ turbine, and
  wherein the high pressure supercritical $CO_2$ storage is arranged between the supercritical $CO_2$ compressor and the supercritical $CO_2$ turbine.

2. The thermal power generation system according to claim 1,
  wherein the low pressure carbon dioxide is supercritical carbon dioxide, and
  the low pressure $CO_2$ storage stores low pressure supercritical carbon dioxide.

3. The thermal power generation system according to claim 1, further comprising:
  a regenerated heat exchanger which supplies exhaust heat of the supercritical $CO_2$ turbine to high pressure supercritical carbon dioxide before being fed to the combustor.

4. The thermal power generation system according to claim 1,
  wherein the supercritical $CO_2$ compressor includes an intercooler.

5. The thermal power generation system according to claim 1, further comprising:
a heat storage which stores heat generated in the supercritical $CO_2$ compressor; and
a heat storage type heat exchanger which supplies heat stored in the heat storage to high pressure supercritical carbon dioxide before being fed to the combustor.

6. The thermal power generation system according to claim 1, further comprising:
a secondary heating heat exchanger which supplies exhaust heat of the supercritical $CO_2$ turbine to supercritical carbon dioxide in a secondary system; and
a secondary supercritical $CO_2$ closed cycle which includes a secondary supercritical $CO_2$ turbine which is driven with the secondary supercritical carbon dioxide heated by the secondary heating heat exchanger, a secondary cooler which cools the exhaust of the secondary supercritical $CO_2$ turbine, and a secondary supercritical $CO_2$ compressor which compresses the carbon dioxide cooled by the secondary cooler.

7. A method for generating thermal electric power comprising the steps of:
compressing carbon dioxide in a low pressure $CO_2$ storage by a supercritical $CO_2$ compressor driven with electric power with varying electric power supply to supply the compressed carbon dioxide to a high pressure supercritical $CO_2$ storage;
driving the supercritical $CO_2$ compressor drive motor and (i) increasing an output of the supercritical $CO_2$ compressor to the high pressure supercritical $CO_2$ storage when detected fluctuation of the electric power is an increase in the varying electric power supply or (ii) decreasing the output of the supercritical $CO_2$ compressor to the high pressure supercritical $CO_2$ storage when detected fluctuation of the electric power is a decrease in the varying electric power supply;
supplying high pressure supercritical carbon dioxide in the high pressure supercritical $CO_2$ storage to a combustor at a constant pressure;
burning oxygen and fuel with the constant pressure supercritical carbon dioxide serving as a working fluid in the combustor;
generating rated power by a generator coupled to a supercritical $CO_2$ turbine which is driven with the supercritical carbon dioxide and water vapor supplied from the combustor; and
storing low pressure carbon dioxide obtained by removing water from exhaust of the supercritical $CO_2$ turbine, and
wherein the high pressure supercritical $CO_2$ storage is arranged between the supercritical $CO_2$ compressor and the supercritical $CO_2$ turbine.

* * * * *